US006360989B1

(12) United States Patent
Maguire

(10) Patent No.: US 6,360,989 B1
(45) Date of Patent: Mar. 26, 2002

(54) NACELLE ASSEMBLY FOR A GAS TURBINE ENGINE

(75) Inventor: Alan R Maguire, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/657,266

(22) Filed: Sep. 7, 2000

(30) Foreign Application Priority Data

Sep. 17, 1999 (GB) ............................................. 9921935

(51) Int. Cl.⁷ ............................................. B64D 33/00
(52) U.S. Cl. .................................. 244/53 B; 244/53 R
(58) Field of Search .................. 244/53 R, 54, 244/53 B; 137/15.1

(56) References Cited

U.S. PATENT DOCUMENTS

| 4,044,973 A | | 8/1977 | Moorehead | |
|---|---|---|---|---|
| 4,500,252 A | * | 2/1985 | Monhardt et al. | 415/9 |
| 5,205,513 A | | 4/1993 | Schilling | |
| 5,259,724 A | * | 11/1993 | Liston et al. | 415/9 |
| 5,447,411 A | * | 9/1995 | Curley et al. | 415/9 |
| 5,524,847 A | | 6/1996 | Brodell | |

FOREIGN PATENT DOCUMENTS

| GB | 2 228 639 A | 10/1995 |
|---|---|---|
| WO | PCT/US82/00373 A | 10/1983 |
| WO | PCT/GB92/00994 A | 2/1993 |

* cited by examiner

Primary Examiner—Charles T. Jordan
Assistant Examiner—Timothy D. Collins
(74) Attorney, Agent, or Firm—W. Warren Taltavull; Manelli Denison & Selter PLLC

(57) ABSTRACT

A nacelle assembly 40 adapted for mounting on a ducted fan gas turbine engine 20 comprising a generally annular body 46 having an air inlet 42 and an air outlet 44, the generally annular body 46 encircling a region of the engine 20 when working in operative association with the engine 20 and has a first attachment means 48 to a rigid member 58 and a second attachment means 52 to a casing assembly 34 on the engine 20 wherein the second attachment means 52 is frangible.

17 Claims, 4 Drawing Sheets

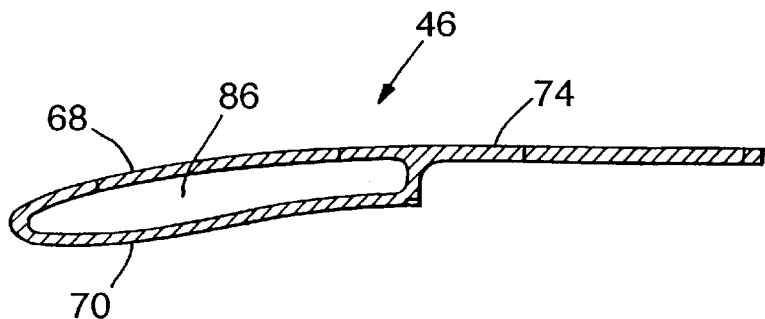
Fig.3.
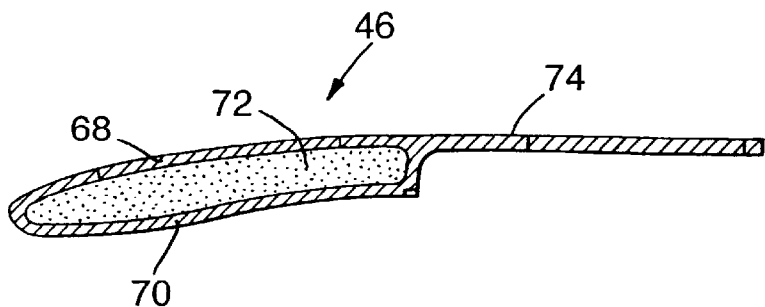
Fig.4.
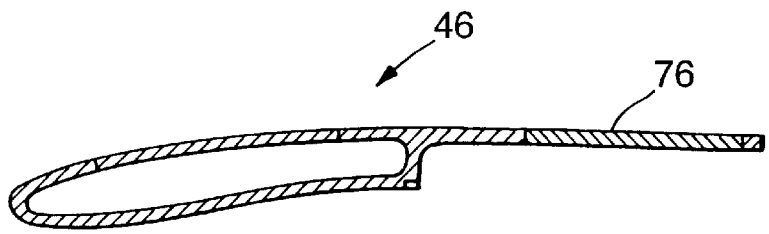
Fig.5.
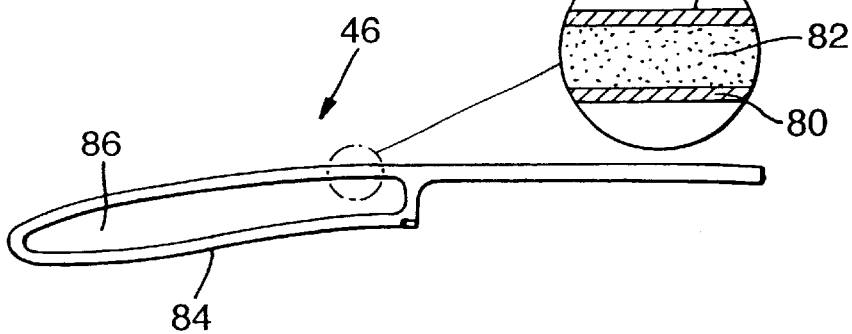
Fig.6.    Fig.6.A.

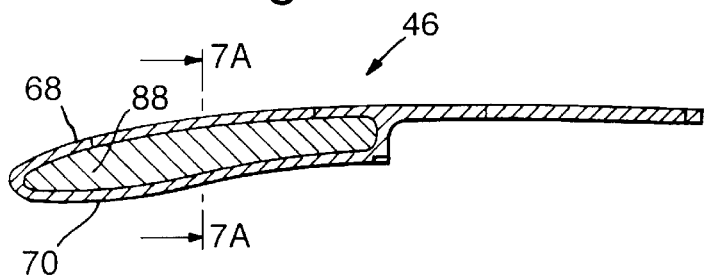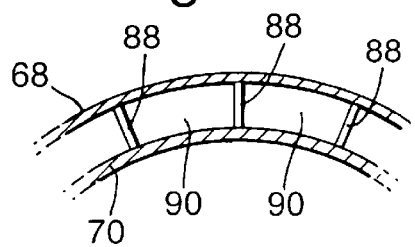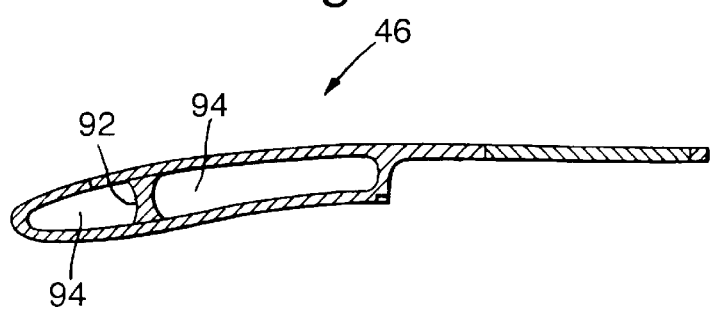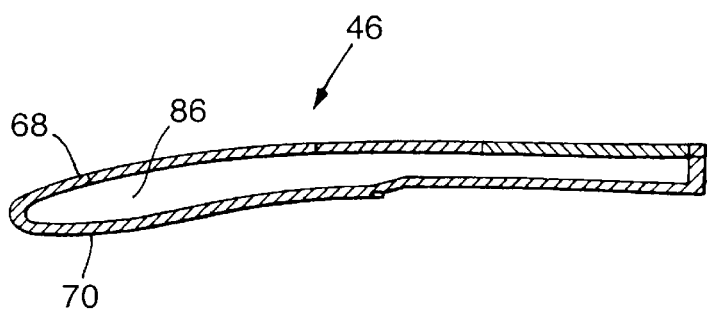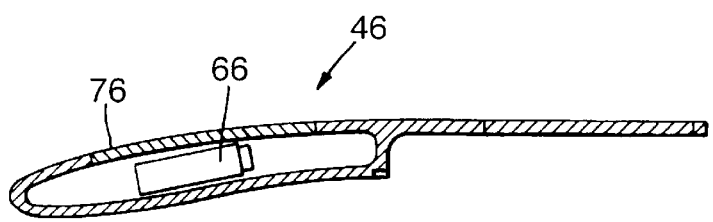

NACELLE ASSEMBLY FOR A GAS TURBINE ENGINE

The present invention relates to a ducted gas turbine engine and includes a nacelle assembly which is detachably connected to a ducted gas turbine engine.

Ducted gas turbine engines usually comprise a core engine which drives a propulsive fan assembly. The fan assembly comprises a number of radially extending aerofoil blades mounted on a common hub and enclosed within a generally cylindrical casing assembly. The fan assembly and casing assembly are encircled by a generally annular nacelle assembly which forms the air intake of the engine and is aerodynamically shaped. The nacelle may extend both forward and rearward, relative to the direction of airflow, of the fan assembly.

There is a remote possibility with such engines that part or all of one or more of the fan blades could become detached from the remainder of the fan assembly. The occurrence of a part or all of one or more of the fan blades becoming detached from the fan assembly and impacting the casing assembly is hereinafter termed a FBO (fan blade off) event. The casing assembly surrounding the fan assembly is specifically designed to contain the detached blade or blade portion. However, it is important that the nacelle is not damaged during the FBO event as the casing assembly is subject to distortion. It is also important to remove the possibility of further damage to the nacelle, after the FBO event, resulting from vibrations during run down and subsequent windmilling due to the fan assembly being out of balance. Run down being hereinafter defined as the deceleration of axial rotational speed of the engine from the rotational speed at which a fan blade or part of a fan blade has been released and caused safety systems to shut down the engine. Windmilling being hereinafter defined as the axial rotation of the fan assembly arising from air ingressing the engine due to the forward speed of the aircraft after engine shut down.

Typically the nacelle assembly may be attached to a component of the engine and/or an engine support pylon assembly with the necessary access to the engine and engine core mounted accessories usually made by either opening fan cowl doors located in the body of the nacelle as described in WO93/02920 or by the nacelle assembly comprising two part-circular portions acting in a clam-shell like manner as described in U.S. Pat. No. 5,205,513. Furthermore, the nacelle assembly is commonly attached to the fan casing as described in U.S. Pat. No. 4,044,973, with such attachments being required to be particularly robust to maintain attachment after a FBO event. The nacelle designs, in particular the attachment means to the engine and/or pylon, of the prior art herein cited lend themselves to complex and heavy, thus expensive, assemblies. The nacelle assemblies also appear to be prone to damage during a FBO event and subsequent vibrational damage caused by windmilling of the out of balance fan assembly during fly home.

It is an object of the present invention to provide a lightweight and low cost nacelle assembly, attached to the engine in such a way as to be releasably detachable therefrom during a FBO event and thereby isolating the nacelle assembly from potentially destructive fan assembly vibrations.

According to the present invention there is provided a nacelle assembly adapted for mounting on a ducted fan gas turbine engine comprising a generally annular body having an air inlet and an air outlet, the generally annular body encircling a region of the engine when working in operative association with the engine and has a first attachment means to a rigid member and a second attachment means to a casing assembly on the engine wherein the second attachment means is frangible.

Preferably the nacelle assembly is adapted for mounting on a gas turbine engine wherein the casing assembly comprises a containment casing and surrounds a fan assembly.

Preferably the nacelle assembly is adapted for mounting on a gas turbine engine wherein the second attachment means provides support in the radial direction.

Preferably the nacelle assembly is adapted for mounting on a gas turbine wherein the second attachment means detaches the nacelle assembly from the casing assembly during a FBO event.

Preferably a nacelle assembly adapted for mounting on a gas turbine wherein the rigid member is a component of the engine. Alternatively the nacelle assembly is adapted for mounting on a gas turbine engine wherein the rigid member is a component of a pylon structure or an aircraft structure.

Preferably the nacelle assembly is adapted for mounting on a gas turbine engine wherein the first attachment means provides support for the nacelle in the radial, axial and circumferential directions.

Preferably the nacelle assembly is adapted for mounting on a gas turbine engine wherein the first attachment means is a releasable attachment.

Preferably the nacelle assembly is adapted for mounting on a gas turbine engine wherein the annular body comprises a radially outer facing and a radially inner facing defining a space therebetween.

Preferably the nacelle assembly is adapted for mounting on a gas turbine engine wherein the annular body comprises the outer facing and inner facing joining and extending rearward of the space to form a single skin. Alternatively the nacelle assembly is adapted for mounting on a gas turbine engine wherein the outer facing and inner facing are constructed from sandwich constructions.

Preferably the nacelle assembly is adapted for mounting on a gas turbine engine wherein the space contains a lightweight core, the lightweight core attached to both the outer facing and the inner facing. Alternatively the nacelle assembly is adapted for mounting on a gas turbine engine wherein the space contains a connector, the connector attached to both the outer facing and the inner facing.

Preferably the nacelle assembly is adapted for mounting on a gas turbine engine wherein the connector extends substantially in the axial direction. Alternatively the nacelle assembly is adapted for mounting on a gas turbine engine wherein the connector extends substantially in the circumferential direction.

Preferably the nacelle assembly is adapted for mounting on a gas turbine wherein the annular body includes an access panel. Alternatively the nacelle assembly is adapted for mounting on a gas turbine engine wherein an engine accessory is operationally located within the space in the annular body.

Preferably a method for assembling a nacelle assembly with an engine comprises the steps aligning the nacelle assembly and the engine substantially parallel to the engine rotation axis, translating the nacelle assembly along the axis to engage the first and second attachments, and securing the first attachment.

Preferably a method for removing a nacelle assembly from an engine comprises the steps releasing the first attachment, translating the nacelle assembly substantially parallel to the axis of the engine.

A specific embodiment of the invention will now be described by way of example with reference to the accompanying drawing in which:

FIG. 3 is a schematic axial cross section side view of another embodiment of a nacelle body construction in accordance with the present invention.

FIG. 4 is a schematic axial cross section side view of another embodiment of a nacelle body construction in accordance with the present invention.

FIG. 5 is a schematic axial cross section side view of another embodiment of a nacelle body construction in accordance with the present invention.

FIG. 6 is a schematic axial cross section side view of another embodiment of a nacelle body construction in accordance with the present invention.

FIG. 6A is a schematic axial cross section side view enlargement of a portion of the embodiment, shown in FIG. 6, of a nacelle body construction in accordance with the present invention.

FIG. 7 is a schematic cross section side view of another embodiment of a nacelle body construction in accordance with the present invention.

FIG. 7A is a schematic axial cross section side view as shown on FIG. 7 of the embodiment of a nacelle body construction in accordance with the present invention.

FIG. 8 is a schematic axial cross section side view of another embodiment of a nacelle body construction in accordance with the present invention.

FIG. 9 is a schematic axial cross section side view of another embodiment of a nacelle body construction in accordance with the present invention.

FIG. 10 is a schematic axial cross section side view of another embodiment of a nacelle body construction in accordance with the present invention.

Figure 1:
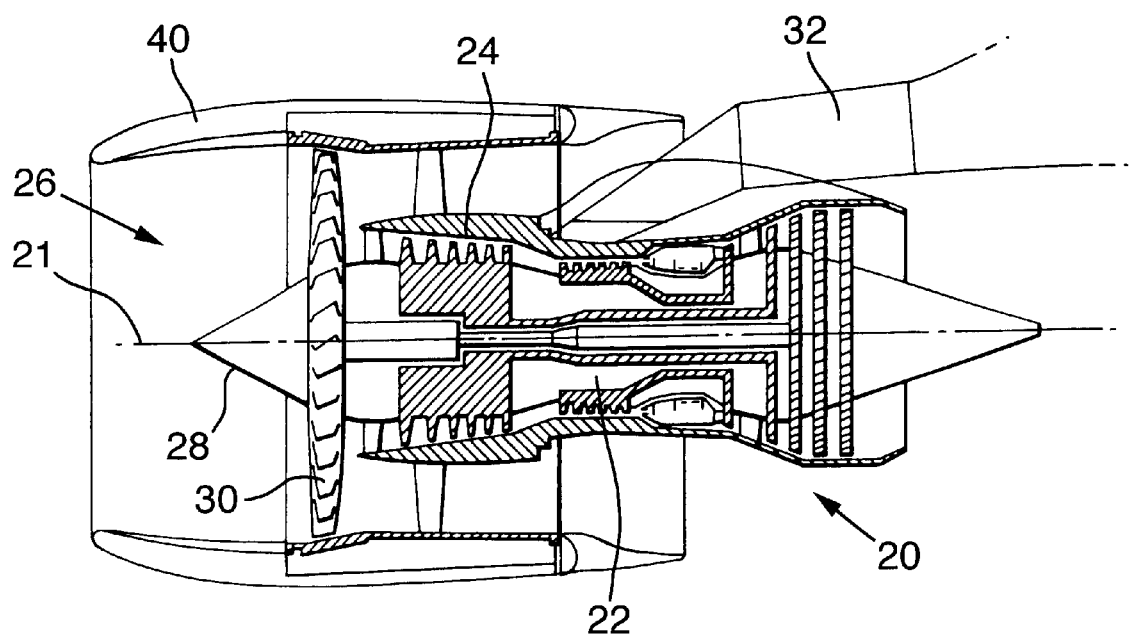
FIG. 1 is a schematic axial cross section side view of a ducted gas turbine engine in accordance with the present invention.

Referring to FIG. 1, a ducted gas turbine engine 20 of known general configuration and method of operation, comprises a rotational axis 21 of the engine 20, an engine core 22 surrounded by a core casing 24 and which drives a propulsive fan assembly 26. The fan assembly 26 comprises a retention disc 28 with an array of radially extending aerofoil blades 30. The engine 20 is secured to an aircraft wing (not shown) from the engine core casing 24 by an engine support pylon assembly 32 in known manner. Alternatively, the engine 20 may be mounted to the aircraft structure (not shown) A nacelle assembly 40 encircles a region of the engine 20.

Figure 2:
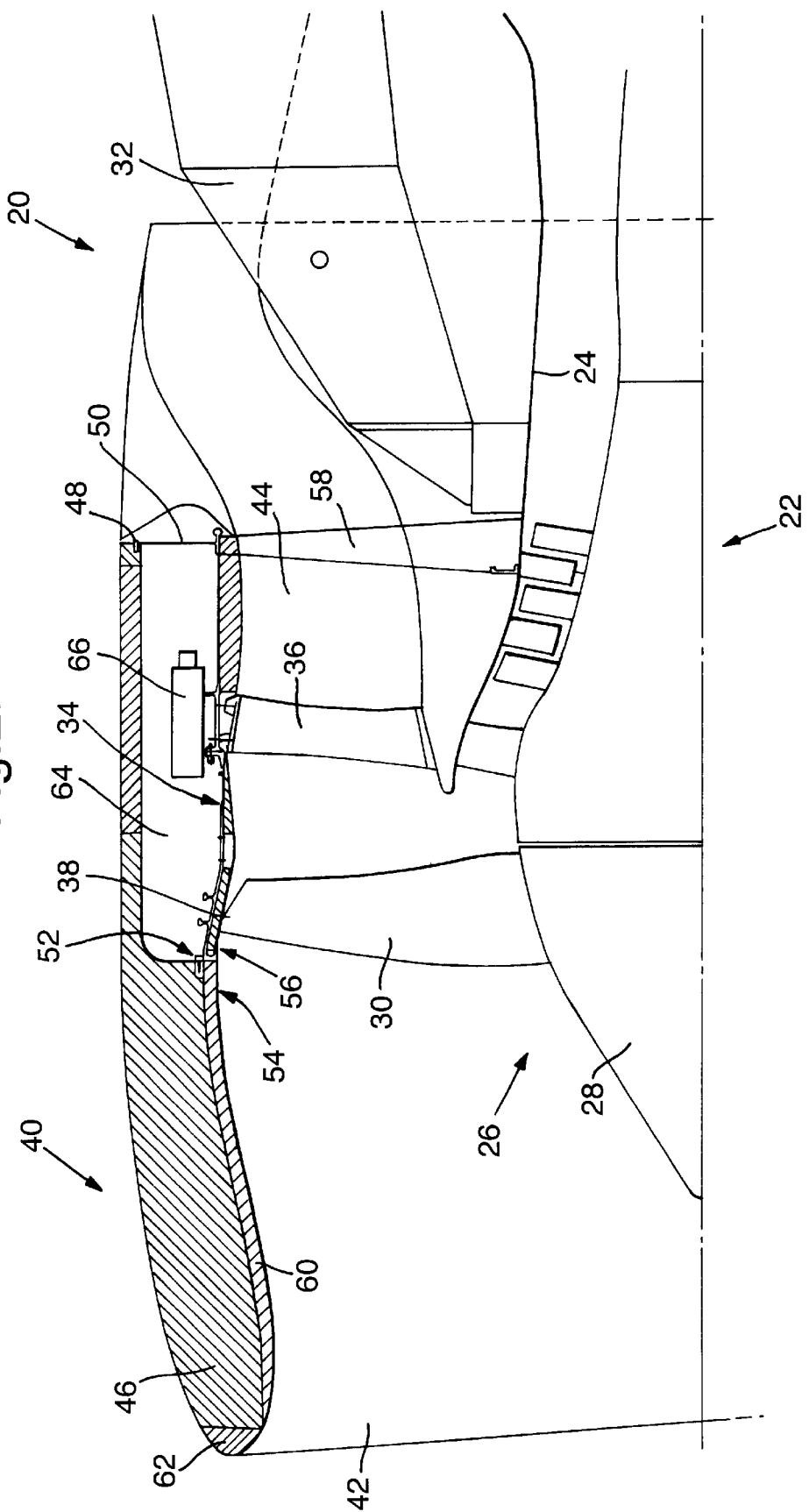
FIG. 2 is a schematic axial cross section side view of the front portion of a ducted gas turbine engine in accordance with the present invention.

Referring to FIG. 2, a casing assembly 34 surrounding the fan assembly 26 and secured to an annular array of radially extending vanes 36 comprises a containment casing 38 for retention of a blade 30 or a portion of a blade 30 during a FBO event.

The nacelle assembly 40 comprises an air inlet 42 and an air outlet 44 and a generally annular body 46 which encircles a region of the engine 20. In particular the nacelle 40 encircles a region of both the casing assembly 34 and the fan assembly 26 and is extended rearwards for attachment by a first attachment means 48 to a strengthening ring 50. The first attachment 48 means is made by conventional means as known in the art so as to provide axial, radial and circumferential support to the nacelle assembly 40. The nacelle assembly 40 is also attached at the front of the casing assembly 34 by a second attachment means 52, the second attachment means 52 is a frangible attachment 52 of construction as known in the art. The second attachment means 52, located upstream of the first attachment means 48, provides support in the radial direction assisting alignment of a gas washed inner nacelle surface 54 and a casing assembly inner surface 56. The frangible attachment 52 is designed to detach the nacelle 40 and the engine casing assembly 34 during a FBO event.

During a FBO event a blade 30 or blade portion 30 is released from the fan assembly 26 and strikes the containment casing 38, part of the casing assembly 34, causing the containment casing 38 and the casing assembly 34 to distort from their original shape. It is an advantage of the present invention that the nacelle 40 detaches from the engine casing assembly 34 during the FBO event so that the nacelle assembly 40 is not damaged. It is another advantage that the nacelle assembly 40 is no longer attached to the casing assembly 34 after the FBO event as it is not subject to the consequential vibrations arising from the out of balance of the fan assembly during run down and windmilling.

The strengthening ring 50 is attached to the engine core casing 24 by a rigid member 58 as known in the art.

The nacelle assembly 40 also comprises an acoustic lining 60 configured and implemented as known in the art.

The nacelle assembly 40 also comprises an anti-icing means 62 as known in the art.

The nacelle assembly 40 is configured to form an annular space 64 radially outward of the casing assembly 34 to accommodate an engine accessory 66. The annular space 64 also provides a space for the casing assembly 34 to deflect without contacting the nacelle assembly 40 during a FBO event.

The nacelle assembly 40 provides an aerodynamic external profile for the engine 20 and an aerodynamic air inlet 42 and air outlet 44 for the propulsive fan assembly 26.

The construction of the nacelle assembly 40 and in particular the annular body 46 is intrinsic to the implementation of the invention. It is intended that the nacelle body 46 is both lightweight and strong. The following descriptions with reference to FIGS. 3 to 10 give details of further embodiments of the annular body 46 in accordance with the present invention.

During normal operation of an engine 20 the nacelle assembly 40 carries aerodynamic loads and loads generated from flexural displacements of the engine 20 and/or the pylon assembly 32.

The method for removal of the nacelle assembly 40, particularly for access to the engine 20, is by way of releasing the first attachment means 48 and translating the nacelle assembly 40 in a generally forward axial direction relative to the engine 20. The second attachment means 52 being so arranged as to disengage the nacelle assembly from the casing assembly 34 when the nacelle assembly 40 is translated forward with respect to the engine 20. Similarly, the method for attachment of the nacelle assembly 40 to the engine 20 is by way of translating the nacelle assembly 40 in a generally rearward axial direction relative to the engine 20 thereby engaging the second attachment means 52 and first attachment means 48. It is preferable for the first attachment means 48 to be relatively easy and quick to release, such attachment means may be conventional clamps, "V"-blades or latches.

Other embodiments of the present invention described hereinafter describe configurations of the nacelle assembly's 40 annular body 46 which perform the aforementioned load carrying. It is important for the annular body 46 to be lightweight and relatively strong particularly after a FBO event. The annular body 46 is required to remain intact and operational throughout the remainder of the flight of the aircraft (not shown). After a FBO event the annular body 46 is attached only by the first attachment means 48 and is subject to aerodynamic loads and loads generated from flexural displacements of the engine 20 and/or the pylon assembly 32. The construction of the annular body 46 is therefore required to be lightweight and strong and the following embodiments hereafter of the present invention describe such constructions.

In another embodiment of the present invention referring to FIG. 3, the construction of the nacelle body 46 is generally annular with respect to the rotational axis 21 of the engine 20 and comprises a radially outer facing 68 and radially inner facing 70. Both the outer facing 68 and the inner facing 70 are relatively thin, strong and stiff and define an internal space 86 therebetween.

The configuration of the nacelle assembly 46 is designed to form a annular space 64 (FIG. 2) radially outward of the casing assembly 34 to accommodate engine accessories 66. This is achieved by discontinuing the internal space 86 in the region of the second attachment means 52 and joining the outer facing 68 with the inner facing 70 to form a single skin 74. The single skin 74 extends rearward to the first attachment means 48 at the strengthening ring 50.

In a another embodiment of the present invention referring to FIG. 4, the construction of the nacelle body 46 comprises a relatively thin, strong and stiff radially outer facing 68 and radially inner facing 70 generally surrounding a lightweight main core 72 as known in the art as a sandwich construction. The purpose of the main core 66 being to transfer bending shear, torque, compressive and tensile stresses and loads between the outer facing 68 and the inner facing 70.

In another embodiment of the present invention, referring to FIG. 5, an annular body 46 as described with reference to the embodiment shown in FIG. 3 having an access panel 76 located in the single skin 74. The access panel 76 allowing access to the engine accessory 66 without removal of the nacelle assembly 40.

In another embodiment of the present invention, referring to FIG. 6 and FIG. 6A, an annular body 46 as described with reference to the embodiment shown in FIGS. 3, 4 and 5 comprising items that are common to both, the outer facing 68 and the inner facing 70 are formed from sandwich constructions themselves with an outer sub-facing 78 and an inner sub-facing 80 generally surrounding a sub-core 82. The outer sub-facing 78 relating to an exterior surface 84 of the annular body 46. The embodiment described with reference to FIG. 5 may also comprise an internal space 86 rather than a main core 72. The embodiment described with reference to FIG. 5 may also comprise an access panel 76 as described with reference to FIG. 5.

In another embodiment of the present invention, referring to FIG. 7, an annular body 46 as described with reference to the embodiments shown in FIGS. 3, 5, 6, 6A comprising an annular array of webs 88 connecting the outer facing 68 and the inner facing 70. Each web 88 extends axially to thereby define an array of voids 90 (FIG. 7A). The webs 88 may extend for the entire axial distance of the void 90 (FIG. 7A) or may extend for a portion of the axial distance of the void 90, so that the voids 90 are interconnected with each other.

In another embodiment of the present invention, referring to FIG. 8, an annular body 46 as described with reference to the embodiments shown in FIGS. 3, 5, 6, 6A comprising a substantially annular connector 92 connecting the outer facing 68 and the inner facing 70. The connector 92 extends substantially radially between the outer facing 68 and the inner facing 70.

In another embodiment of the present invention, referring to FIG. 9, an annular body 46 as described with reference to the embodiments shown in FIGS. 3, 4, 5, 6, 6A, 7, 7A, 8 comprising extending the internal space 86 rearward in the annular body 46. For this embodiment it is intended for the internal space to be extended to the region of the first attachment means 48. The internal space 86 may also comprise a main core 72 or any of the features such as the web 90 or the connector 92.

In another embodiment of the present invention, referring to FIG. 10, an annular body 46 as described with reference to the embodiments shown in FIGS. 3, 4, 5, 6, 6A, 7, 7A, 8, 9 comprising arranging the engine accessory 66 between the outer facing 68 and inner facing 70 of the annular body 46. With reference to the aforesaid embodiments the engine accessory 66 may be positioned substantially within the internal space 86, the void 92 or the annular void 94.

Although the present invention has been described with reference to the first attachment means 48 being releasably attached to the strengthening ring 50 the first attachment means 48 may also be attached in a similar manner to any relatively rigid engine 20 component, such as the casing assembly 34, the annular array of vanes 36 or the rigid member 58.

Suitable materials for the facing 68, 70, 78, 80 and single skin 74, access panel 76 and the web 88 and the connector 92 include thermoplastics and thermosets (eg. polythene, polycarbonate, polyethersulphone, polyetheretherketone (PEEK), polyvinylchloride (PVC), epoxy resin cured by amines, nylon, polytetraflouroethelene (PTFE)), resins (e.g. Epoxy, polyamides, phenolic, silicone, cyanoacrylates, anaerobics and acrylics), ceramics (e.g. silicon nitride, silicon carbide, glass-ceramics), aluminium alloys (e.g. Al—Cu, Al—Mg, AL—Mg—Si, Al—Zn—Mg, Al—Li), magnesium alloys, titanium alloys and nickel, which may be reinforced with the following materials: glass, aramid, carbon, alumina, silicon carbide. Suitable materials for the main core 72 and the sub-core 82 include expanded plastics (e.g. polyurethane), low density woods, honeycomb structures (e.g. aluminium, paper).

I claim:

1. A nacelle assembly adapted for mounting on a ducted fan gas turbine engine comprising a generally annular body having an air inlet and an air outlet, a first attachment means and a second attachment means, the generally annular body encircling a region of the engine when working in operative association with the engine, the first attachment means attached to a rigid member and a second attachment means attached to a casing assembly on the engine wherein the second attachment means is frangible and detaches the nacelle assembly from the casing assembly during a FBO event.

2. A nacelle assembly adapted for mounting on a gas turbine engine as claimed in claim 1 wherein the casing assembly comprises a containment casing, the a containment casing surrounds a fan assembly.

3. A nacelle assembly adapted for mounting on a gas turbine engine as claimed in claim 1 wherein the second attachment means provides support in the radial direction.

4. A nacelle assembly adapted for mounting on a gas turbine engine as claimed in claim 1 wherein the rigid member is a component of the engine.

5. A nacelle assembly adapted for mounting on a gas turbine engine as claimed in claim 1 wherein the rigid member is a pylon assembly structure.

6. A nacelle assembly adapted for mounting on a gas turbine engine as claimed in claim 1 wherein the rigid member is a component of the aircraft structure.

7. A nacelle assembly adapted for mounting on a gas turbine engine as claimed in claim 1 wherein the first attachment means provides support for the nacelle in the radial, axial and circumferential directions.

8. A nacelle assembly adapted for mounting on a gas turbine engine as claimed in claim 1 wherein the first attachment means is a releasable attachment.

9. A nacelle assembly adapted for mounting on a gas turbine engine as claimed in claim 1 wherein the annular body comprises a radially outer facing and a radially inner facing, the radially outer facing and the radially inner facing defining a space therebetween.

10. A nacelle assembly adapted for mounting on a gas turbine engine as claimed in claim 9 wherein the annular body comprises the outer facing and inner facing joining and extending rearward of the space to form a single skin.

11. A nacelle assembly adapted for mounting on a gas turbine engine as claimed in claim 9 wherein the outer facing and inner facing are constructed from sandwich constructions.

12. A nacelle assembly adapted for mounting on a gas turbine engine as claimed in claim 9 wherein the space contains a lightweight core, the lightweight core attached to both the outer facing and the inner facing.

13. A nacelle assembly adapted for mounting on a gas turbine engine as claimed in claim 9 wherein the space contains a connector, the connector attached to both the outer facing and the inner facing.

14. A nacelle assembly adapted for mounting on a gas turbine engine as claimed in claim 13 wherein the connector extends substantially in the axial direction.

15. A nacelle assembly adapted for mounting on a gas turbine engine as claimed in claim 13 wherein the connector extends substantially in the circumferential direction.

16. A nacelle assembly adapted for mounting on a gas turbine engine as claimed in claim 1 wherein the annular body includes an access panel.

17. A nacelle assembly adapted for mounting on a gas turbine engine as claimed in claim 9 wherein the nacelle assembly comprises an engine accessory, the engine accessory is operationally located within the space in the annular body.

* * * * *